(No Model.)
W. C. JOHNSTON.
SPRING MOTOR.
No. 487,745. Patented Dec. 13, 1892.
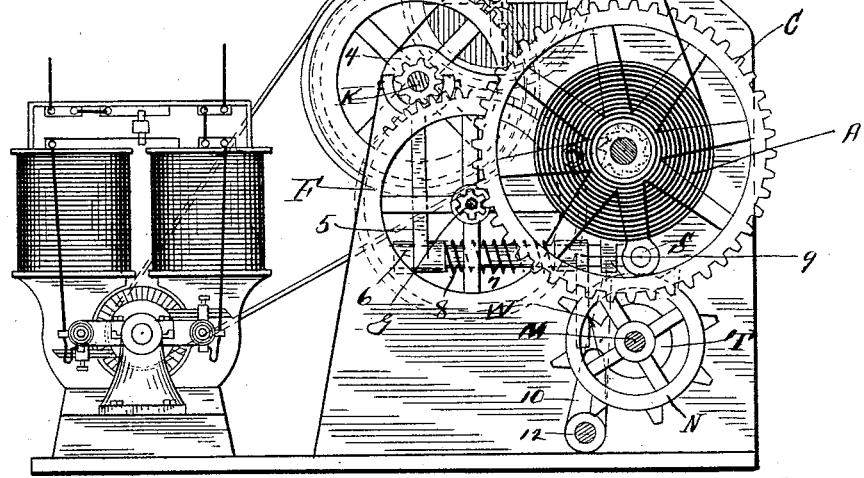

UNITED STATES PATENT OFFICE.

WILLIAM C. JOHNSTON, OF MELROSE, MASSACHUSETTS.

SPRING-MOTOR.

SPECIFICATION forming part of Letters Patent No. 487,745, dated December 13, 1892.

Application filed January 29, 1892. Serial No. 419,656. (No model.)

*To all whom it may concern:*

Be it known that I, WILLIAM C. JOHNSTON, of Melrose Highlands, in the county of Middlesex, Commonwealth of Massachusetts, have invented certain Improvements in Spring-Motors, of which the following, taken in connection with the accompanying drawings, is a specification.

This invention relates to improvements in spring-motors, and is designed to provide means whereby to run a dynamo for small electric-lighting plants.

In the drawings, Figure 1 is an end elevation of a motor embodying this invention. It represents, also, in end elevation a dynamo having belt connection with a motor. Fig. 2 is a side elevation of the motor.

In carrying out my invention I have provided several independently-acting power-producing mechanisms, each operated by its own motive spring, and have so arranged the several mechanisms into a series as that each member of the series shall operate successively, the second member being automatically set in action by the action of the first member, and so on, each successive member of the series being automatically set in motion by its preceding member.

As represented in the accompanying drawings, two sets of the mechanism are shown, which I shall describe as follows: The spring A is connected with and actuates the main shaft B. On this shaft is a gear C. Said gear C meshes with pinion G on the same shaft with the gear-wheel F, which in turn operates the gear H, the gear H being loose on the supplemental power-transmitting shaft K. On the second supplemental shaft M is a toothed wheel N, arranged to have its teeth engaged by the pin S on gear C, as shown. On shaft M is a cam T, provided with a cam-tooth W, Fig. 1. On the shaft K is a clutch 4, that is splined to slide longitudinally and turn with the shaft K, engaging said clutch, as represented, with one arm of the lever 5, which has its opposite arm pivoted in the bracket 6, Fig. 1. Extending from the said lever is an arm-shaft 7, on which is a spiral spring 8 and a downwardly-hanging arm 9, on which said spring bears one end. In operation, the said spring A having been suitably wound, the lever-arm 9 stands, Fig. 1, bearing against the cam-tooth W, whereby the cam is prevented from turning, and as the tension of the spring is exhausted through the described train of mechanism to move said cam upwardly against the arm 9 the whole mechanism remains locked until exhausted by some movement of the arm 9 away from cam-tooth W, and thus permits the mechanism to move.

A double set of mechanism like that already described is represented and designated in the drawings, the parts being respectively indicated by the following characters: *a b c f g h s m n t* 24 25 29, which are placed upon the respective parts.

In operation the several power-producing mechanisms, having had their respective springs suitably wound, are made to operate serially as follows: The first power-producing mechanism is set in motion by having its arm 9 lifted away from the cam-tooth W, this being done by sliding the arm 9 on shaft 7. Thereupon the spring 8 operates to move clutch 4 into engagement with its gear H, and thus causes the mechanism to operate and revolve shaft K during the uncoiling operation of spring A. As the mechanism revolves each revolution of gear C causes its pin S to engage with tooth on wheel N, and thus revolve step by step wheel N. The arrangement is such that a complete revolution of wheel N exhausts the action of spring A, and as the cam T is revolved the cam-tooth W is brought into engagement with arm 10, and thereby moves the arm 10 to rock the shaft 12. This operation is effected as the wheel N is about completing its first revolution and the first train of mechanism is about to stop. Said rocking movement of the shaft 12 operates to move the arm 14 against the lever 29, and thus removes said lever from cam-tooth of the second train of mechanism, and thereby releases said second train to allow its motor-spring to act upon and continue the revolution of shaft K.

Several duplicate sets of mechanism may be arranged in one machine to suit the requirements in any case and obtain the motor power of any required duration.

Connected with the shaft K is a train of mechanism, as shown, extending to a regulator consisting of fan 20, whereby the speed of said shaft K is suitably regulated. Also connected with shaft K is a pulley having belt connection with the dynamo, as represented.

Having thus described my invention, I claim—

1. A spring-motor comprising a series of independent power-producing mechanisms and having a main shaft, a series of springs for operating said main shaft successively, a series of gears carried thereby, a supplemental power-transmitting shaft also having gears, connections between the gears on the main and supplemental shafts, a second supplemental shaft driven by the gears on the main shaft in succession, a cam on said shaft for locking the mechanism, a shaft, as 12, rocked by said cam at one portion of its movement, and connections between the rock-shaft and the succeeding power-producing mechanism for releasing the same, substantially as described.

2. A spring-motor comprising a series of independent power-producing mechanisms and having a main shaft, a series of springs for operating said main shaft in succession, a series of gears carried by said main shaft, a supplemental power-transmitting shaft also having gears, a clutch for operatively connecting the gears on the main and supplemental shafts, a second supplemental shaft driven by the gears on the main shaft in succession, a cam on said second supplemental shaft for locking the mechanism, a spring for operating the clutch when the mechanism is released from the cam, a shaft, as 12, rocked by said cam at one portion of its movement, and connections between the rock-shaft and the succeeding power-producing mechanism for releasing the same and throwing it into operation, substantially as described.

3. A spring-motor comprising a main shaft, a series of springs for operating said main shaft successively, a series of gears carried thereby, a supplemental power-transmitting shaft having gears, connections between the gears on the main and supplemental shafts, a second supplemental shaft driven by the gears on the main shaft in succession, means for locking the gears, a cam on said shaft having a tooth for locking the mechanism, a rock-shaft 12, having an arm 10, adapted to be struck by the cam-tooth, and an arm, as 14, on said rock-shaft for releasing the mechanism, substantially as described.

4. In combination with a main shaft B, a series of springs for driving the same, a series of gears C thereon, a second shaft, as K, a gear H, loose thereon and driven from the main shaft, a clutch splined on the shaft K and adapted to be moved into engagement with the gear H, a pin on said gears C, a second supplemental shaft M, a toothed wheel thereon engaging the pin on the gear C, a cam on said shaft having a tooth for locking the mechanism, a rock-shaft 12, having an arm 10, adapted to be struck by the cam-tooth, and an arm, as 14, on said rock-shaft for releasing the mechanism, substantially as described.

5. In the herein-described apparatus, the springs A, the gears C, the main shaft B, the pins S on the gears C, the shaft K, the gear H, loose thereon, the clutch 4, engaging the gear H, the lever 5 for actuating the clutch pivoted to the frame, the shaft 7, the spiral spring 8, the downwardly-extending arm 9, movable on said shaft 7, the shaft M, the toothed wheel thereon engaging the pins S, the cam T, having the tooth W for locking the arm 9, the rock-shaft 12, having arm 10, engaging cam-tooth W, and an arm, as 14, on said rock-shaft for moving the arm 9 out from engagement with the cam-tooth, substantially as described.

Signed at Lynn, Massachusetts, this 22d day of January, A. D. 1892.

WM. C. JOHNSTON.

Witnesses:
E. E. HAMILL,
A. M. TUTTLE.